No. 826,173. PATENTED JULY 17, 1906.
A. E. KNIGHT.
STORAGE BATTERY PLATE OR ELECTRODE.
APPLICATION FILED NOV. 8, 1905.

Witnesses.
Inventor.
Alfred E. Knight
by Jas. H. Churchill
atty.

UNITED STATES PATENT OFFICE.

ALFRED E. KNIGHT, OF SOMERVILLE, MASSACHUSETTS, ASSIGNOR TO JAMES H. CHURCHILL, TRUSTEE, OF QUINCY, MASSACHUSETTS.

STORAGE-BATTERY PLATE OR ELECTRODE.

No. 826,173.   Specification of Letters Patent.   Patented July 17, 1906.

Application filed November 8, 1905. Serial No. 286,327.

*To all whom it may concern:*

Be it known that I, ALFRED E. KNIGHT, a citizen of the United States, residing in Somerville, in the county of Middlesex and State of Massachusetts, have invented an Improvement in Storage-Battery Plates or Electrodes, of which the following description, in connection with the accompanying drawings, is a specification, like letters on the drawings representing like parts.

This invention relates to a storage-battery electrode or plate, and has for its object to increase the durability, conductivity, and efficiency of the same. For this purpose the electrode or plate is composed of two members or grids each of which consists of a thin sheet of lead or like conducting material having punctures or openings distributed over it and having bars or ribs attached to one face, which form compartments or chambers into which the active material, such as oxid of lead, is firmly packed. The grids or members are secured together with the perforated sheets on the outside, and the active material in the chambers of one member is separated from the active material in the chambers of the other member by a thin film, sheet, or wall of conducting material, such as lead-foil, which is firmly clamped between the members or grids to make good electrical contact therewith, whereby the conductivity of the electrode or plate is increased. The interposed sheet, film, or wall of lead or other conducting material may be provided with substantially fine openings or perforations to permit of the percolation of the electrolyte through said film or wall and the active material, but which perforations are so fine as to prevent free or unrestrained circulation of the electrolyte through the electrode, thereby reducing to a minimum loss of active material by the slushing action of the electrolyte and by the violent agitation of the gases when the battery is being charged. The perforated interposed wall also forms a support for the active material. These and other features of this invention will be pointed out in the claims at the end of this specification.

Figures 1, 2:
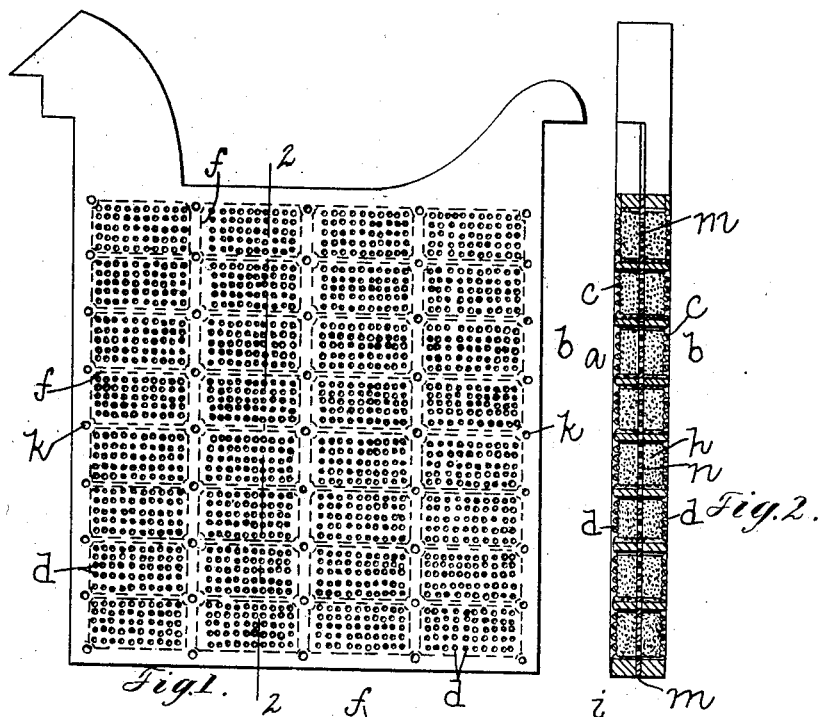
Figure 3:
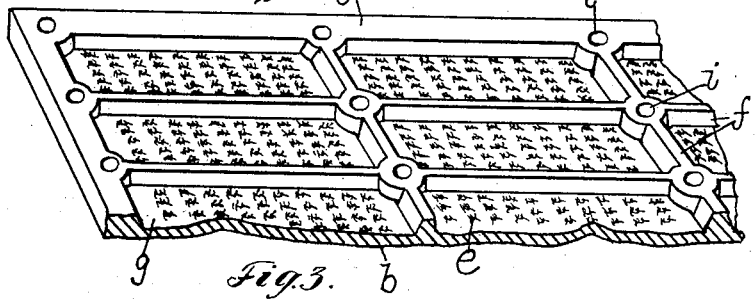
Figure 4:
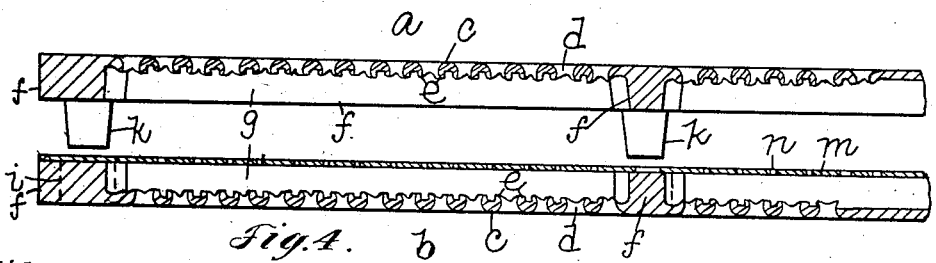

Figure 1 is a front elevation of an electrode or plate embodying this invention; Fig. 2, a section on the line 2 2, Fig. 1; Fig. 3, a detail of one member of the electrode; and Fig. 4 a detail, on an enlarged scale, to be referred to.

The storage-battery plate or electrode embodying this invention consists, essentially, of two members $a\ b$, (see Fig. 4,) each comprising a substantially thin sheet $c$ of lead or like acid-resisting material having substantially small perforations or openings $d$, the walls of which are preferably broken to leave ragged edges $e$, and longitudinal and transverse ribs or thickened portions or bars $f$, which form chambers or compartments $g$, into which the active material $h$, such as oxid of lead, is firmly packed or pressed. The bars or ribs $f$ of one member, as $b$, may be provided with holes or openings $i$, which are extended to the outside of said member and are adapted to receive locking projections or lugs $k$ on the bars or ribs of the other member $a$, the said projections or lugs preferably extending beyond the outside of the member $a$, where they are upset, to firmly lock the said members together.

To prevent, or at least reduce to a minimum, the washing out of the active material $h$ by the free circulation of the electrolyte transversely through the plate, while at the same time affording opportunity for said electrolyte to percolate through the active material and also to increase the conductivity of the electrode or plate, a substantially thin wall, sheet, or foil $m$, of lead or like acid-resisting and conductive material or materials, is interposed between the members $a\ b$ and is firmly secured thereto by the locking projections.

The interposed wall, sheet, or film $m$ is preferably provided with fine or substantially small perforations $n$, which permit the electrolyte to percolate through the mass of active material confined between the members of the plate, but which do not afford opportunity for a free and unobstructed circulation or slushing action of the electrolyte through the plate, and as a result waste of active material is avoided or reduced to a minimum, thereby increasing the life of the plate and also increasing the conductive capacity of the same. In practice the fine openings $n$ in the interposed conducting wall, sheet, or foil $m$ may be staggered with relation to the openings $d$ in the outside sheets of the members of the plate to still further break up or prevent free flow or circulation of the electrolyte transversely through the plate or electrode. Furthermore, the interposed foil, wall, or sheet $m$ serves as an additional support for the active material, for in making up the plate or electrode each member has its chambers $g$ first filled with active material or such as may become active. The thin metal sheet or foil $m$ is placed between the two members and the whole subjected to pressure, thus riveting the several pieces together and forming a complete electrode. The active material under the pressure above described is forced into the perforations in the wall or sheet $m$.

While it may be preferred to provide the interposed foil, wall, or thin sheet with perforations, it is not desired to limit the invention in this respect, as an imperforate foil, wall, or sheet may be used to advantage.

Each of the members $a$ $b$ may be cast in one piece, or the ribs may be cast in one piece and the outside wall or sheet $c$ then burned onto said ribs.

It is preferred to make the interposed wall or sheet $m$ of conductive material, such as lead, as by so doing the conductivity of the electrode is increased, while at the same time the slushing action of the electrolyte is reduced to a minimum; but it is not desired to limit the invention to a conductive wall or sheet $m$, as it may be made of non-conductive material, such as celluloid, in which case the benefit of said wall or sheet in reducing or preventing slushing action of the electrolyte is obtained.

I claim—

1. A battery plate or electrode comprising two members, each having a perforated outside metallic wall or plate and metallic ribs or bars on the inner surface of said wall or plate arranged with the bars in close proximity to each other, and a substantially thin metallic wall or sheet interposed between the said members and making contact with the ribs or bars of both members, and means to secure the said members and sheet together, substantially as described.

2. A battery plate or electrode comprising two members, each comprising a perforated outside metallic plate or wall and longitudinal and transverse metallic bars or ribs on the inner surface of said wall forming pockets for the active material, locking projections on the ribs of one member extended into openings in the ribs of the other member, and a substantially thin sheet or foil of conductive material interposed between said members and electrically connected therewith and through which the said locking projections extend, substantially as described.

In testimony whereof I have signed my name to this specification in the presence of two subscribing witnesses.

ALFRED E. KNIGHT.

Witnesses:
   Jas. H. Churchill,
   J. Murphy.